United States Patent
Minardi

(10) Patent No.: US 12,213,948 B2
(45) Date of Patent: Feb. 4, 2025

(54) MASS MEASUREMENT APPARATUS FOR AUTOMATIC PROCESSING MACHINES AND MASS MEASUREMENT METHOD

(71) Applicant: I.M.A. INDUSTRIA MACCHINE AUTOMATICHE S.P.A., Ozzano dell'Emilia (IT)

(72) Inventor: Marco Minardi, Ozzano dell'Emilia (IT)

(73) Assignee: I.M.A. INDUSTRIA MACCHINE AUTOMATICHE S.P.A., Ozzano dell'emilia (IT)

( * ) Notice: Subject to any disclaimer, the term of this patent is extended or adjusted under 35 U.S.C. 154(b) by 554 days.

(21) Appl. No.: 17/609,080

(22) PCT Filed: May 12, 2020

(86) PCT No.: PCT/IB2020/054466
§ 371 (c)(1),
(2) Date: Nov. 5, 2021

(87) PCT Pub. No.: WO2020/230013
PCT Pub. Date: Nov. 19, 2020

(65) Prior Publication Data
US 2022/0226195 A1     Jul. 21, 2022

(30) Foreign Application Priority Data
May 13, 2019   (IT) ................. 102019000006754

(51) Int. Cl.
*A61J 3/10*     (2006.01)
*A61J 3/07*     (2006.01)
(Continued)

(52) U.S. Cl.
CPC ............ *A61J 3/074* (2013.01); *A61J 3/10* (2013.01); *B25J 19/02* (2013.01); *G01G 3/165* (2013.01);
(Continued)

(58) Field of Classification Search
CPC ... B65B 1/32; B65B 3/003; B65B 3/28; A61J 3/074; A61J 2200/74; A61J 3/10;
(Continued)

(56) References Cited

U.S. PATENT DOCUMENTS 4,947,694 A * 8/1990 Kirman ............... G01G 3/16
177/210 FP
6,881,907 B2 * 4/2005 Winkelmolen ........ G01G 15/00
209/582

(Continued)

FOREIGN PATENT DOCUMENTS

WO     2019/087066     5/2019

OTHER PUBLICATIONS

International Search Report issued Oct. 2, 2020 in International (PCT) Application No. PCT/IB2020/054466.

*Primary Examiner* — Randy W Gibson
(74) *Attorney, Agent, or Firm* — Wenderoth, Lind & Ponack, L.L.P.

(57) ABSTRACT

A mass measuring apparatus includes a transferring and gripping device for removing an article from a seat of a movement device, holding the article in a measuring position, and then reinserting the article into the seat. The transferring and gripping device includes a gripping element for holding the article, an actuator for operating with an actuating signal on the gripping element to make the gripping element vibrate at a specific resonance frequency, a sensor for measuring a vibration response signal of the gripping element vibrating and supporting the article in the
(Continued)

measuring position, a processing unit for receiving the vibration response signal and controlling the actuator to generate an actuating signal to make the gripping element vibrate at an operating resonance frequency, and then calculating a mass of the article by comparing the operating resonance frequency with the resonance frequency of the gripping element.

25 Claims, 6 Drawing Sheets

(51) Int. Cl.
  *B25J 19/02* (2006.01)
  *B65B 1/32* (2006.01)
  *B65B 3/28* (2006.01)
  *G01G 3/16* (2006.01)
  *G01G 15/00* (2006.01)
  *G01G 19/18* (2006.01)
  *B65B 3/00* (2006.01)

(52) U.S. Cl.
  CPC .............. *G01G 15/006* (2013.01); *B65B 1/32* (2013.01); *B65B 3/003* (2013.01); *B65B 3/28* (2013.01); *G01G 15/00* (2013.01); *G01G 19/18* (2013.01)

(58) Field of Classification Search
  CPC ....... A61J 9/4833; G01G 19/14; G01G 19/18; G01G 3/16; G01G 3/165; G01G 15/006; G01G 15/00; G01G 3/10; A61K 9/4833; B25J 13/085; B25J 19/02; B25J 19/028
  USPC ............................................ 177/201 FP, 145
  See application file for complete search history.

(56) References Cited

U.S. PATENT DOCUMENTS

| | | | |
|---|---|---|---|
| 7,216,543 B2 | 5/2007 | Paik et al. | |
| 7,337,074 B2 | 2/2008 | Herrmann et al. | |
| 7,753,085 B2 * | 7/2010 | Tribble | A61J 3/002 141/2 |
| 8,455,773 B2 * | 6/2013 | Trebbi | G01G 17/00 141/83 |
| 2004/0225454 A1 | 11/2004 | Herrmann et al. | |
| 2006/0015268 A1 | 1/2006 | Paik et al. | |
| 2019/0307643 A1 * | 10/2019 | Tribble | B65C 3/26 |
| 2021/0177700 A1 | 6/2021 | Ribani et al. | |

\* cited by examiner

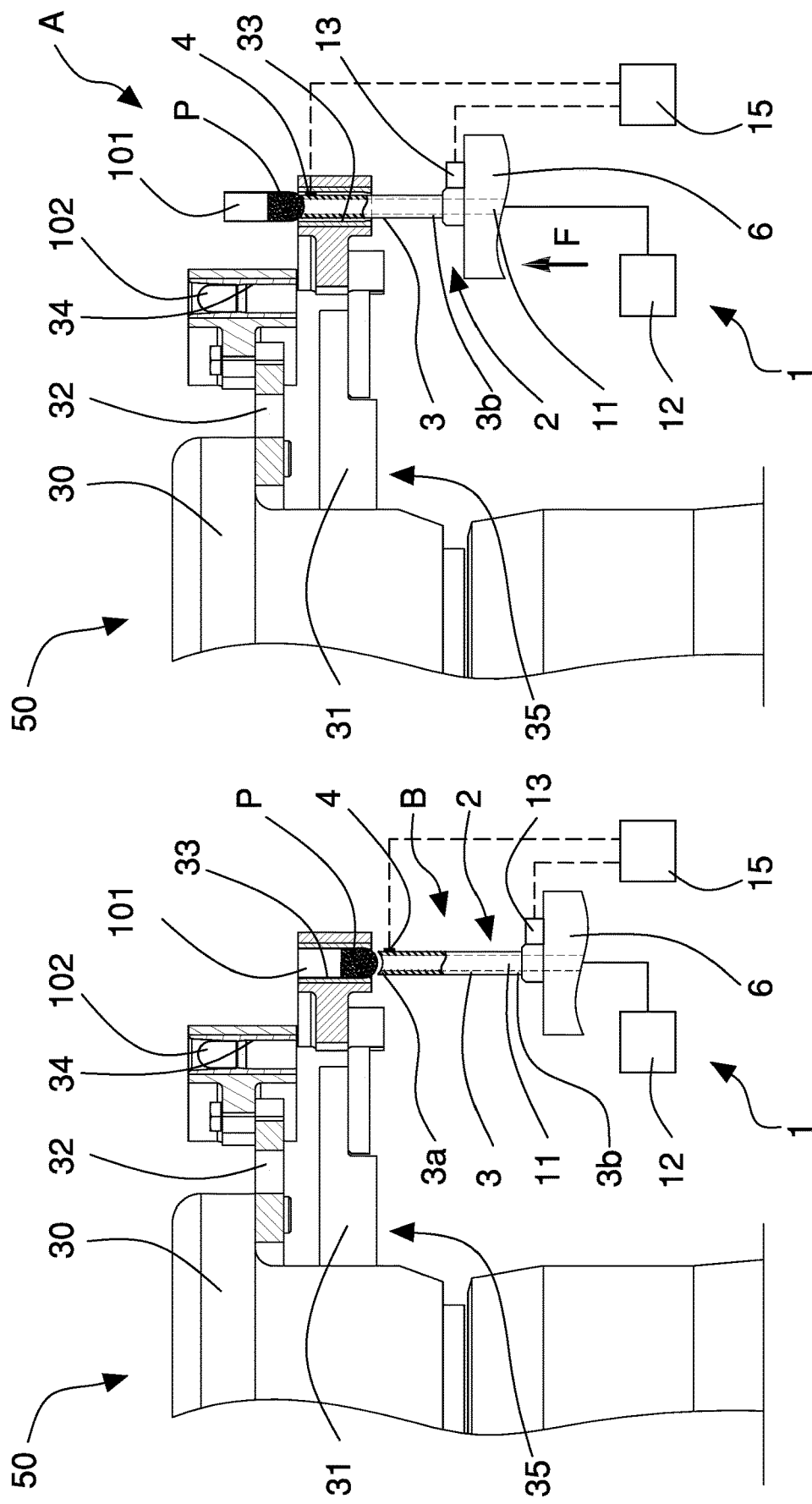

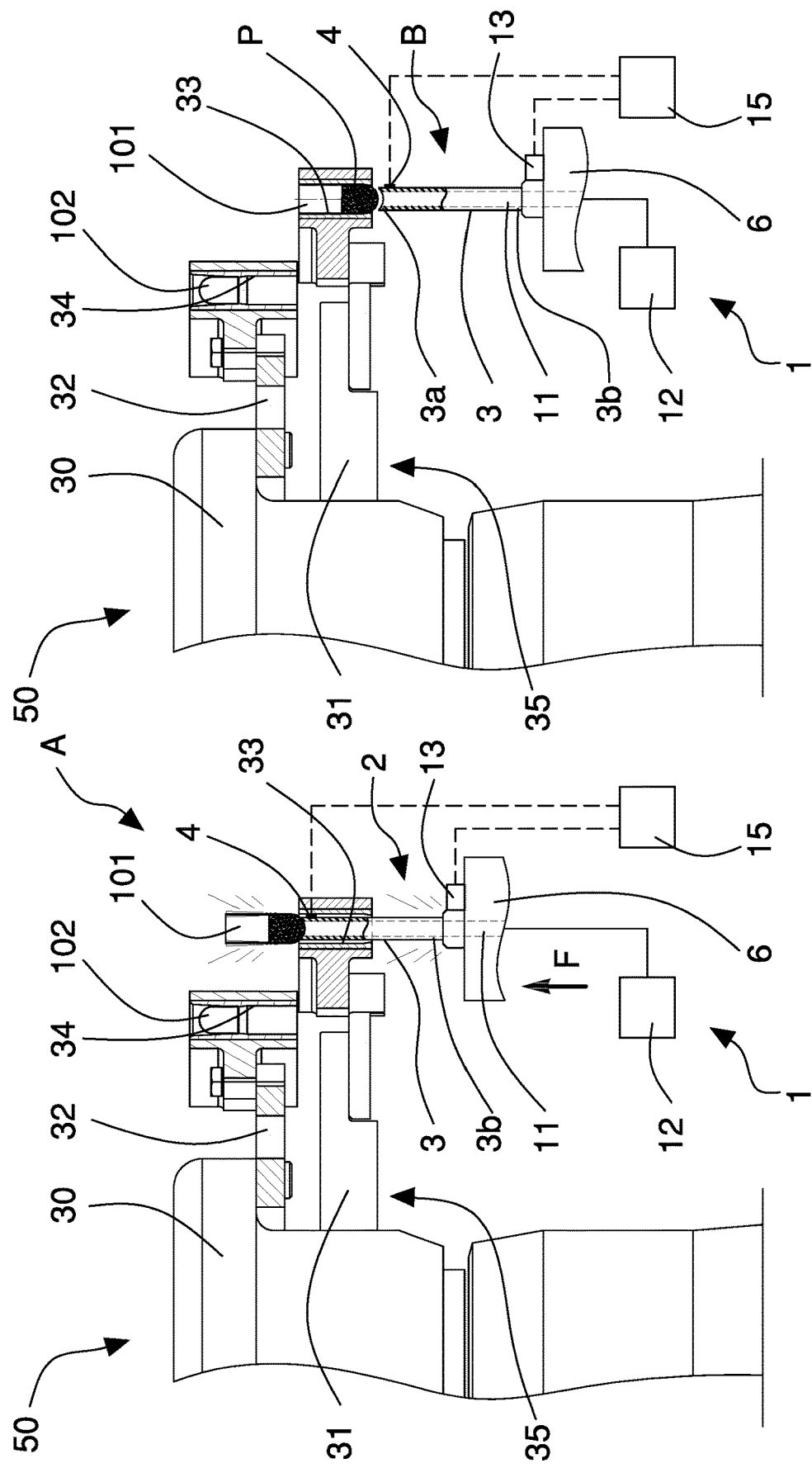

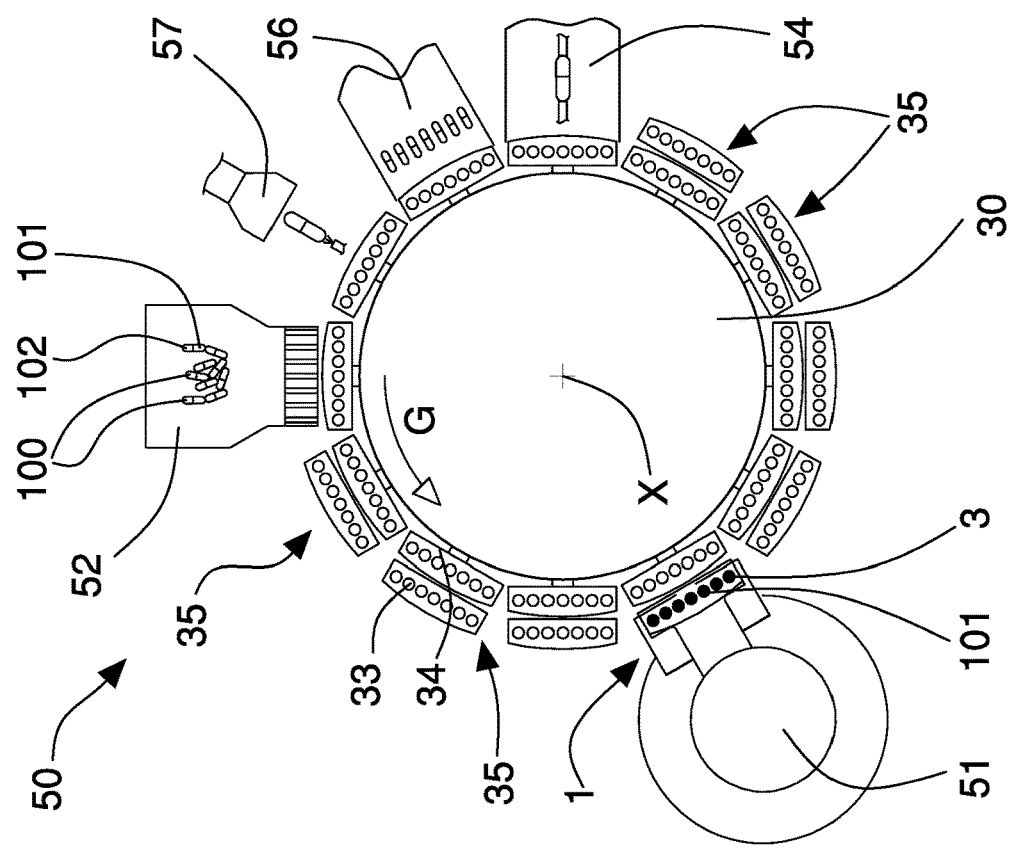
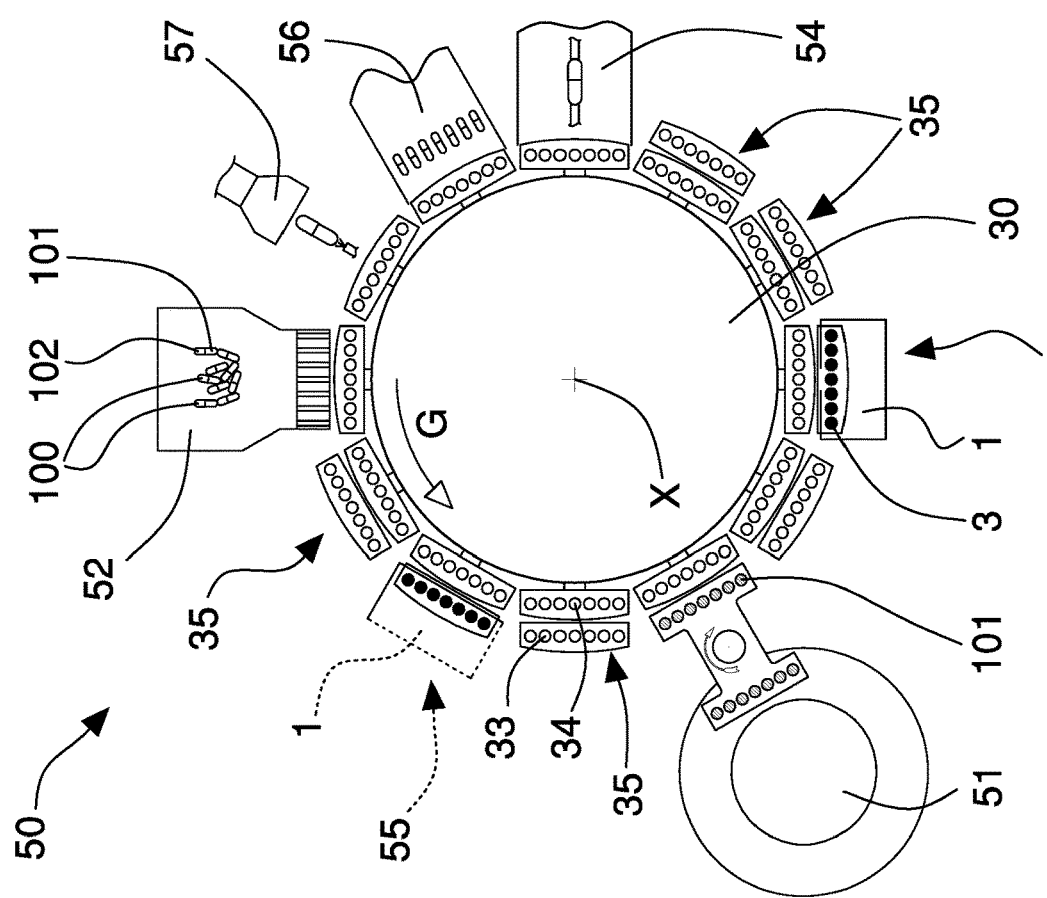

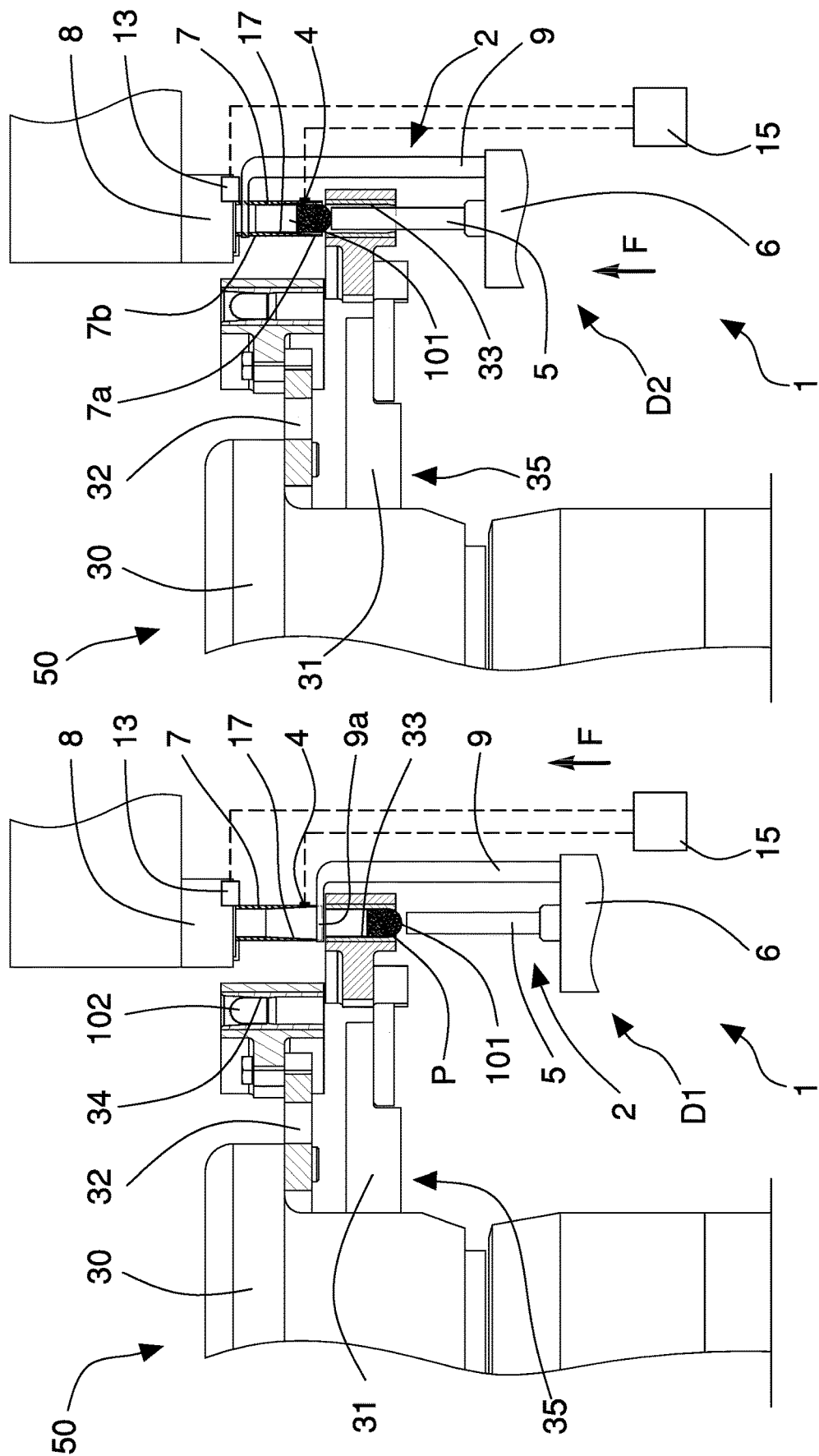

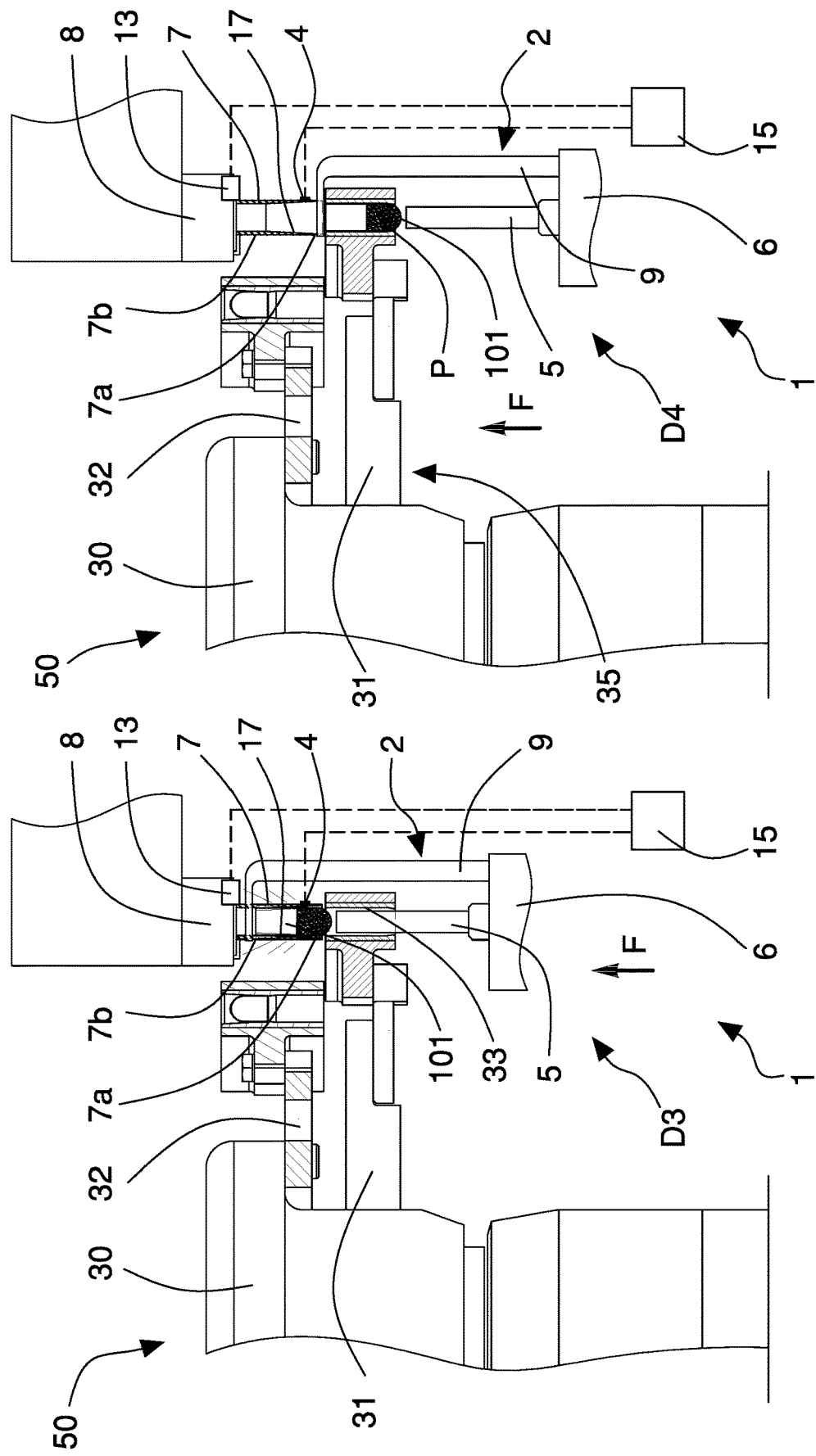

MASS MEASUREMENT APPARATUS FOR AUTOMATIC PROCESSING MACHINES AND MASS MEASUREMENT METHOD

The present invention relates to systems and apparatuses for measuring the weight of articles in automatic processing and packaging machines. In particular, the invention relates to a mass measurement apparatus associated with an automatic filling machine or an automatic compressing machine for measuring the mass of processed articles, such as capsules, opercula or tablets, lozenges or the like, in particular for pharmaceutical or food use. The invention also relates to a method for measuring the mass of processed articles such as capsules, opercula, or tablets, lozenges, or the like in an automatic processing machine. Systems for measuring the weight or mass of processed and/or packaged articles are widely used in the processing and packaging machinery sector. Generally, although reference is made to the weight of the articles, what is actually provided at the end of the measurement is their mass (expressed in kg), since the weight (or weight force) is a force (expressed in N), given by the product of the mass of the article and the gravitational acceleration (expressed in $Nm/s^2$). Indeed, the weighing systems normally used in the manufacturing and packaging processes of capsules, tablets, and the like comprise electronic scales that measure the weight force of an article and then calculate its mass by dividing the measured weight force by the gravitational acceleration considered constant (although in fact it is variable with the latitude and altitude of the place where the measurement is carried out). In general, in the industrial field, weight is referred to as mass (so-called kilogram weight $Kg_p$ equal to 9.81 N).

In the processes of filling capsules or opercula, typically in hard gelatin, with liquid, powder, granules, time-release products, tablets, etc., the use of measurement apparatuses located downstream of the filling machine or filling station of the latter to measure the mass of the product dosed in the capsules is known.

Similarly, apparatuses are known and used to measure the mass of tablets, lozenges made in a compressing machine, by compressing products in powder or granules.

Mass or weight control is necessary to discard non-compliant articles, capsules or tablets from production, because they contain a quantity of product outside the allowed tolerance range and to correct any excesses or defects in the product dosage, acting in feedback on the filling machine.

In fact, especially in the pharmaceutical sector it is very important to verify that the quantity of product present in the articles, capsules or tablets, is exactly that which is required, with very narrow tolerance ranges.

In the filling processes generally the mass (or weight) of the capsules is only measured once at the end of the dosing, since the mass of the empty capsules is known and contained within a defined tolerance range, indicated and guaranteed by the suppliers/producers of the capsules. In this way, from the measurement of the mass or weight of the filled capsule (gross weight), by subtracting the known weight of the empty capsule (tare) it is possible to calculate the weight of the dosed product (net weight) with a certain degree of precision.

In filling processes in which the quantity of product to be dosed in the capsules is very small, for example a few milligrams (so-called "micro-doses"), and the tolerance range required for the dosage of the product is limited, for example ±10%, it is necessary to first weigh the empty capsule as well and calculate the weight of the dosed product using the difference. In these cases, since the weight of the empty capsules is comparable to that of the dosed product, the normal weight variations of the empty capsules can be larger than the tolerance range of the allowed dosage.

Solutions are therefore known which provide a first weighing station, upstream of the filling machine or of the filling station, which measures the weight of the empty capsules (tare), and a second weighing station, downstream of the filling machine or of the filling station, which measures the weight of the filled capsules (gross weight). The difference between the two measured weights allows precisely calculating the net weight of the dosed product.

The weighing apparatuses that perform this type of direct measurement comprise electronic scales typically equipped with a plurality of measurement cells, or load cells, each of which is equipped with a respective support (plate) on which the capsule must be positioned for the time necessary for the correct measurement.

The weight control can be of the total type, i.e. performed on all the capsules filled with the product (so-called 100% weight control) or a partial, statistical type control carried out on a sample of filled capsules, randomly selected.

In certain types of pharmaceutical production, however, the control of all the filled capsules is required and in general this solution is widely preferred by pharmaceutical companies in order to guarantee a better quality of the processed articles.

It is known that to perform an accurate and precise weighing using electronic scales, an adequate measurement time is necessary. In particular, between the deposition of the article on the plate of the scale and the measurement of its weight, a minimum interval of time must elapse, necessary to allow the scale to stabilize, i.e. to allow the damping of the vibrations that are generated by resting the article on the plate and to proceed with the weight detection.

Consequently, in order to ensure this adequate measurement time, the operating or production speed of the filling machine must be considerably reduced.

Systems for the indirect measurement of the weight of the capsules or tablets comprising microwave sensors, capacitive sensors, sensors based on magnetic resonance imaging technology are also known. These indirect measurement systems require reduced measurement times and therefore do not require a reduction in the speed of the filling machine, but in addition to being very expensive and rather laborious and complex to adjust and use, they have the disadvantage of not guaranteeing the measurement reliability and certainty of the direct measurement systems.

An object of the present invention is to improve the known mass measurement or weighing apparatuses associated with automatic processing machines, in particular capsule filling machines or compressing machines, for measuring the weight of processed articles, e.g. capsules, opercula or tablets, lozenges or the like.

Another object is to provide a mass measurement apparatus capable of measuring the mass of the articles processed by the machine with high accuracy, precision and resolution and with very short measurement times.

A further object is to realize a mass measurement apparatus associated with an automatic processing machine that allows to perform a total weight control, i.e., to measure the mass of all processed articles, even at high operating speeds of the machine.

These and others objects are achieved by a compressing machine according to claim 1.

The invention can be better understood and implemented with reference to the attached drawings which illustrate some exemplifying and non-limiting embodiments thereof, wherein:

FIGS. 1 to 4 are schematic and partially sectional side views of the mass measurement apparatus of the invention associated with an automatic processing machine arranged to fill articles consisting of capsules with a product, in respective different steps of a mass measurement process of the capsules;

FIG. 5 is a schematic plan view of the mass measurement apparatus and the machine of FIGS. 1-4;

FIG. 6 is a schematic plan view of a variant of the automatic processing machine of FIG. 5;

FIGS. 8 to 11 are schematic and partially sectional side views of a variant of the mass measurement apparatus of the invention associated with the automatic processing machine of FIG. 5 adapted to fill articles consisting of capsules, in respective different steps of a measurement process;

Figure 12:
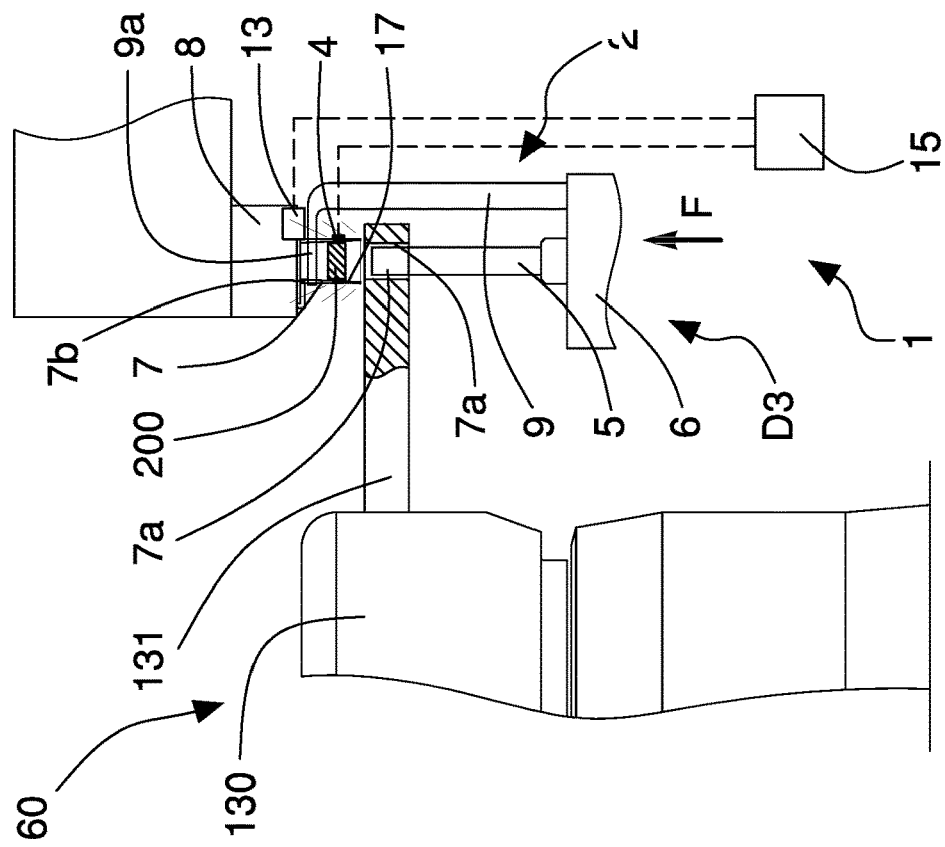
FIG. 12 is a schematic and partially sectional side view of the variant of the mass measurement apparatus of FIGS. 8-11 associated with an automatic processing machine adapted to realize articles consisting of tablets, in a step of the mass measurement process of the tablets.

With reference to FIGS. 1 to 5, the mass measurement apparatus 1 of the invention associated with an automatic processing machine 50 for measuring the mass $m_a$ of articles 100 or parts 101 thereof is schematically illustrated, the articles 100 being processed by the machine 50 that comprises at least one movement device 30 provided with seats 33, 34 adapted to house and move the articles 100.

In the illustrated embodiment, the automatic processing machine is a filling machine 50 arranged to fill with a liquid, powder, granules, time-release, tablets, etc. product P, in particular a pharmaceutical product, articles 100 in the form of capsules. Each capsule 100, of a known type and made of hard gelatin, comprises a lower part or bottom 101 and an upper part or cover 102 which can be temporarily decoupled and separated to dose the product P into the bottom 101.

The filling machine 50, schematically illustrated in FIG. 5 comprises, for example, a plurality of operating stations 51-57 arranged to perform operations on the capsules 100 moved in sequence with intermittent motion through the operating stations 51-57 by the movement device 30. The filling machine 50 comprises a filling station 51 arranged to dispense doses of product P into the bottoms 101 of the capsules 100 and the mass measurement apparatus 1 is, for example, positioned downstream of said filling station 51 so as to measure the mass of the bottoms 101 containing a respective dose of product P. The movement device 30, of a known type, comprises a carousel or table, rotatable with intermittent motion about a vertical rotation axis X and provided with a plurality of supports 35, arranged angularly spaced along the periphery or a circumferential edge of the aforementioned table. Each support 35 is formed by a first supporting element 31, having a plurality of first seats 33, intended to house the bottoms 100a of the capsules 100 and a second supporting element 32, having a plurality of further seats 34 intended to house the covers 102 of the capsules 100. The supporting elements 31, 32 have an elongated shape and are movable with respect to one another between an overlapping position in which the respective seats 33, 34 are aligned and overlapped for the insertion or removal of the whole capsules 100 (i.e. with the covers 102 applied to the respective bottoms 101) and an offset position in which the seats 33 containing the bottoms 102 are accessible to allow the dosing of the product.

The seats 33, 34 of the supports 35 comprise respective through cavities, i.e. open at the opposite ends, and having a converging shape and/or suitably shaped to receive and hold by force or interference coupling the bottoms 101 and the covers 102 of the capsules 100. The mass measurement apparatus 1 comprises transferring and gripping means 2 arranged to remove an article 100, in particular a part 101 thereof, in particular a lower part or bottom 101 containing a respective dose of product P, from a respective seat 33 of the movement device 30, hold the bottom 101 in a measuring position A and then reinsert the bottom 101 into the respective seat 33. The transferring and gripping means 2 comprise at least one gripping element 3 adapted to hold a respective bottom 101 in the measuring position A.

The mass measurement apparatus 1 further comprises actuator means 13, operating with a vibration actuating signal, e.g., a harmonic type signal, on the gripping element 3 so as to make the latter oscillate or vibrate at a specific resonance frequency $f_0$ or natural frequency, and sensor means 4 adapted to measure a vibration response signal of the gripping element 3 vibrating and in particular supporting the bottom 101 in the measuring position A.

The mass measurement apparatus 1 further comprises a processing unit 15 connected to the sensor means 4 for receiving the vibration response signal and controlling the actuator means 13 in order to, alternatively:

modify the actuating signal of the actuator means 13 so as to make the gripping element 3 supporting the bottom 101 oscillate or vibrate at an operating resonance frequency $f_m$ (i.e. the natural frequency of the system formed by the gripping element-bottom-product dose) and then calculate a mass $m_a$ of the bottom 101, in particular containing a respective dose of product P, by comparing the aforementioned operating resonance frequency $f_m$ with the specific resonance frequency $f_0$ of the gripping element 3 (i.e. not supporting the bottom 101, i.e. free); or maintaining the actuating signal of the actuator means 13 to force the gripping element 3 supporting the bottom 101 to oscillate or vibrate at the specific resonance frequency $f_0$ and then calculate a mass $m_a$ of the bottom 101, in particular containing a respective dose of product P, by measuring a delay or operating phase difference $\Delta\phi_m$ between the actuating signal generated by the actuator means 13 and the response signal detected by the sensor means 4.

As better explained in the following description, the gripping element 3 acts, substantially, as a mechanical resonant or resonator element, capable of entering into resonance, i.e., becoming the seat of oscillations having a certain resonance frequency, when urged by a vibration actuating signal, i.e., by a periodic actuating force, for example of a harmonic type, variable with the same frequency. As well known, in a mechanical system the resonance frequency or natural frequency is the frequency at which the amplitude of the vibration is maximum. The resonance frequency of a resonator element is determined by the shape and geometry of the latter, by the physical characteristics of the material (density, elastic constant, damping factor, etc.) with which it is made, as well as by the type of constraint or mechanical fixation of the resonator element to a base or support.

In the embodiment illustrated in FIGS. 1 to 4, the transferring and gripping means 2 comprises one or more gripping elements 3 each of which movable along an extraction direction F and arranged to remove a bottom 101 from the respective seat 33, hold it in the measuring position A and then reinsert it in the seat 33 at the end of the measurement. More precisely, the transferring and gripping means 2 comprise a plurality of gripping elements 3 arranged side by side and in a number equal to that of the seats 33 of each support 35 so as to simultaneously extract all the bottoms 101 housed in the seats 33. The extraction direction F is almost vertical and parallel to the rotation axis X of the movement device 30.

The gripping element 3 has an elongated shape and is shaped to be inserted, when moved along the extraction direction F, inside and through a respective seat 33 of the movement device 30 and has an operative end 3a shaped and adapted to abut and support a bottom 101. The gripping element 3 has, for example, a cylindrical shape with smaller transverse dimensions than those of the seat 33 so as to be inserted with transverse play in the latter in order to avoid possible contact with the inner walls of the seat 33 also during the oscillation phase induced by the actuator means 13.

Fastening means 11, 12 are associated with the gripping element 3 and arranged to fix the bottom 101 extracted from the respective seat 33 of the movement device 30 to the operative end 3a of the gripping element 3 so that the bottom 101 does not fall or move during the movement of the gripping element 3 in the measuring position A and, above all, when the gripping element 3 is oscillated by the actuator means 13.

The fastening means 11, 12 comprises, for example, a suction duct 11 carried out inside the gripping element 3 and leading to the operating end 3a and connected to an air suction unit 12. The gripping element 3 has in this case an elongated cylindrical tubular shape. The mass measurement apparatus 1 further comprises a supporting element 6 which rigidly supports the gripping element 3 and is movable along the extraction direction F to move said gripping element 3 between an inactive position B in which the gripping element 3 is spaced from the seat 33 and the measuring position A in which the gripping element 3 passes through the seat 33 and supports and holds the bottom 101. In the illustrated embodiment, the supporting element 6 supports the plurality of gripping elements 3.

The actuator means comprise at least one vibrating actuator 13 or oscillator, e.g., a piezoelectric actuator, operating on the respective gripping element 3 to make the latter vibrate at the respective resonance frequency by applying a periodic force, e.g., sinusoidal, with adequate frequency and amplitude. The vibrating actuator 13 is connected to, for example wirelessly, and controlled by the processing unit 15 and is preferably fixed to a lower end 3b of the gripping element 3, at the supporting element 6.

It is also provided that instead of comprising a vibrating actuator 13 for each gripping element 3, the actuator means comprises a single vibrating actuator fixed to the supporting element 6 and configured to vibrate all the gripping elements 3.

In a variant of the mass measurement apparatus 1 of the invention not illustrated, the actuator means comprises the same supporting element 6, which is oscillated by external vibrations generated by the automatic processing machine 50 in the operation thereof and which, since rigidly connected to the gripping elements 3, oscillates the latter with oscillations having the resonance frequency.

The sensor means 4 comprises a plurality of vibration sensors, e.g. MEMS accelerometers, fixed directly to the respective gripping elements 3, in particular at their operating end 3a. Alternatively, the sensor means 4 may comprise a plurality of optical sensors, for example laser measurement sensors, each of which is pointed at the respective gripping element 3, in particular at its operative end 3a. The sensor means 4 are wirelessly connected to the processing unit 15.

Still alternatively, the sensor means 4 may comprise one or more among deformation sensors, bending sensors, torsion sensors, in particular piezoelectric or piezoresistive type sensors, for example strain-gauge sensors or PVDF elements, each of which suitably fixed to the respective gripping element 3.

The operation of the mass measurement apparatus 1 of the invention is based on known technology that provides for the use of systems with resonant mechanical elements or resonators to determine or measure the mass of samples or elements made integral with the aforementioned resonators. In such systems the variations in the characteristics of the resonator vibration are in fact directly linked to the variations in the mass of the resonator and more precisely of the sample or article to be measured made integral thereto.

At first approximation, neglecting the resonator damping coefficient, the resonance frequency or natural frequency $f_0$ of the latter may be expressed by the following formula:

$$f_0 \approx \sqrt{\frac{k}{m}} \qquad \text{eq. 1}$$

wherein
k is the effective elastic coefficient of the resonator;
m is the effective mass of the resonator.

The elastic coefficient and mass are defined as effective because they include a plurality of additional physical characteristics of the resonator. For example, the effective mass is defined not only by the vibrating mass of the resonator but also by the type of mechanical attachment or constraint of the resonator to a base or support. Likewise, the elastic coefficient of the resonator comprises the elastic constant of the resonator material, but also its density, damping factor, geometric conformation, dimensions, etc.

By varying the mass of the resonator to which the sample or article to be measured is constrained, i.e. in the specific case by varying the mass of the gripping element 3 that collects and holds a respective bottom 101 containing a dose of product P, the resonance frequency of the resonator/sample system (gripping element/bottom 101 system) also varies correlatively. More precisely, the operating resonance frequency $f_m$ of the gripping element 3 supporting the vibrating bottom 101 is expressed by the formula:

$$f_m \approx \sqrt{\frac{k}{m + \delta m}} \qquad \text{eq. 2}$$

wherein
m is the effective mass of the gripping element 3;
δm is the variation in mass of the resonator/sample system, i.e. the mass $m_a$ of the bottom 101 of the capsule or article 100 processed by the machine containing a dose of product. Assuming that the elastic properties of the resonator remain unchanged and that the mass variation is small, equation 2 can be differentiated in the first order with respect to the mass, obtaining the linear proportionality ratio between the variation of resonance frequencies and the mass variation:

$$f_m - f_0 \propto \delta m \qquad \text{eq. 3}$$

By comparing the operating resonance frequency $f_m$ of the resonator/sample system with the specific resonance frequency $f_0$ of the resonator alone, i.e. of the free gripping element 3, it is therefore possible for the processing unit 15 to calculate the mass variation $\delta m$ of the system, i.e. the mass $m_a$ of the bottom 101 containing the product P.

In particular, it has been verified by the applicant that by means of the measurement apparatus 1 of the invention a mass variation of about 0.15-0.7 mg of the resonator/sample system (gripping element/bottom) corresponds to a nominal variation of about 1 Hz of the resonance frequency. Since the sensor means 4 and the processing unit 15 are capable of detecting and measuring variations around one hundredth Hz, the measurement apparatus 1 of the invention is capable of measuring the mass of the bottoms 101 at a very high resolution, e.g., between 0.0015 and 0.007 mg.

Alternatively, the mass measurement apparatus 1 of the invention allows to accurately calculate the mass $m_a$ of the bottoms 101 by measuring a delay or operating phase difference $\Delta\phi_m$ between the actuating signal applied by the resonant element 13—which forces the resonator/sample system (i.e. the gripping element 3 supporting the bottoms 101 with the dose of product P) to vibrate at the specific resonance frequency $f_0$—and the vibration response signal detected by the sensor means 4. More precisely, the operating phase difference $\Delta\phi_m$ between the actuating signal, with the specific resonance frequency $f_0$, and the resonator/sample system response signal, can be calculated by the formula:

$$\tan\phi_m \propto -\frac{f_0}{f_0^2 - f_m^2} \qquad \text{eq. 4}$$

$\phi$ is the phase angle,
$f_0$ is the vibration resonance frequency of the gripping element 3;
$f_m = f_0 + \Delta f$ is the operating resonance frequency of the gripping element 3 supporting the bottom 100, wherein $\Delta f$ is the change in resonance frequency induced on the gripping element 3 by the added mass of the bottom 101 and the relative dose of product P.

In other words, by varying the mass of the gripping element 3 (resonator) to which the sample or article to be measured is constrained, i.e. in the specific case by varying the mass of the gripping element 3 that collects and holds a respective bottom 101 containing a dose of product P, the phase difference $\Delta\phi_m$ between the actuating signal and the response signal also varies correlatively.

More precisely, by forcing the gripping element 3 to vibrate at its resonance frequency $f_0$, a mass change $\delta m$ (mass of the bottom 101 with the dose of product P) thereon results in a change in the operating phase delay i.e. an operating phase difference $\Delta\phi_m$, which in the first approximate order is expressed by the relationship:

$$\Delta\phi_m \propto \delta m \qquad \text{eq. 5}$$

wherein the coefficient of proportionality depends on the specific resonance frequency $f_0$ and the effective mass of the gripping element 3.

With this measurement methodology it is possible to take advantage of a higher speed of response signal acquisition and processing management, as it is not necessary to use automatic tracking techniques of the operating resonance frequency $f_m$ (e.g. a phase-locked loop PLL based system) of the resonator/sample system.

In particular, it has been experimentally verified by the applicant that with the measurement apparatus 1 of the invention a mass variation of about 2 mg of the resonator/sample system (gripping element 3/bottom 101/dose of product P) corresponds to a variation of about 1 degree of the operating phase variation $\Delta\phi_m$. Since the sensor means 4 and the processing unit 15 are capable of detecting and measuring variations around one hundredth of a degree, in this configuration the measurement apparatus 1 of the invention is capable of measuring the mass of the bottoms 101, for example at a resolution of about 0.02 mg.

With reference to FIGS. 1 to 4, the operation of the mass measurement apparatus 1 of the invention associated with the automatic processing machine 50 arranged to fill capsules 100 with doses of product P, provides for the following operational steps.

During the operation of the machine 50, at each step of stopping the intermittent motion of the movement device 30, a seat 33 of the latter containing a bottom 101 with a relative dose of product P to be measured is arranged at a respective gripping element 3 of the measurement apparatus 1. The gripping element 3 is then moved along the extraction direction F from the inactive position B to the measuring position A so as to extract the bottom 101 from the seat 33. The latter is held and firmly constrained to the operating end 3a of the gripping element 3 by vacuum, by virtue of the suction of air through the suction duct 11 connected to the suction unit 12.

In the measuring position A, the gripping element 3, which crosses the seat 33 without touching the internal walls, is vibrated by the actuator means 13 with a suitable actuating signal so as to enter into resonance (i.e. so as to vibrate at the operating resonance frequency of the gripping element 3/bottom 101/dose of product P system) for a defined measurement interval or time, between 10 and 20 ms. In this measurement range, the sensor means 4 measures the vibration response signal and send it to the processing unit 15 which is configured to determine the above-mentioned operating resonance frequency $f_m$ and calculate the mass $m_a$ of the bottom 101 by comparing the above-mentioned operating resonance frequency $f_m$ with the known specific resonance frequency $f_0$ of the gripping element 3 alone or free, i.e. not supporting the bottom 101.

The specific resonance frequency $f_0$ of the gripping element 3 alone is, for example, preliminarily determined by the processing unit 15 by measuring with the sensor means 4 the response signal of the gripping element 3 vibrated by the actuator means 13 before being moved along the direction F and having extracted the bottom 101 from the seat 33. Alternatively, in the measuring position A, the gripping element 3, which crosses the seat 33 without touching its internal walls, is forced to vibrate by the actuator means 13 at the specific resonance frequency $f_0$ of the gripping element 3 for a defined measurement interval or time, between 10 and 20 ms. In this time interval, the sensor means 4 detects the response signal of the gripping element 3 supporting the bottom 101 so that the processing unit 15 is able to calculate the mass $m_a$ of the bottom 101 by measuring an operating phase difference $\Delta\phi_m$ between the actuating signal generated by the actuator means 13 and the response signal detected by the sensor means 4.

At the end of the measurement, i.e. at the end of the defined time interval, the gripping element 3 is moved from the measuring position A to the inactive position B so as to reposition the bottom 101 inside the respective seat 33.

After the stopping step, the movement device 30 is moved so as to position a subsequent seat 33 with the respective bottom 101 at the mass measurement apparatus 1.

Thanks to the mass measurement apparatus 1 of the invention associated with an automatic processing machine 50, in particular a filling machine for capsules, opercula or the like, it is therefore possible to measure with high accuracy, precision and resolution the mass of the articles or capsules 100 processed by the machine, and more precisely the mass $m_a$ of the bottoms 101 of the capsules 100 filled with the product P. In particular, the mass measurement apparatus 1 allows a resolution on the measured mass between, for example, 0.0015 and 0.007 mg.

Furthermore, since the measurement carried out by the apparatus of the invention is very rapid, with a measurement time or interval between 10 and 20 ms, i.e. much less than the stopping time of the intermittent movement of the machine, it is possible to perform a total weight control, i.e. to measure the mass of all the processed capsules 100, even with high machine operating speeds, i.e. with reduced values of the aforementioned stopping interval. With particular reference to FIG. 5, the filling machine 50 is illustrated, which comprises a feeding and opening station 52 of the capsules 100 by means of which the latter are introduced into the filling machine 1, the covers 102 removed and separated from the relative bottoms 101 which can thus receive the product P in the subsequent filling station 51. The bottoms 101 and the covers 102 are inserted and housed respectively in the seats 33 and in the further seats 34 of the supports 13 of the movement device 30. A capsule closing station 54 is provided for coupling the covers 102 to the respective bottoms 101 and thus closing the capsules 100 after filling and weighing.

The mass measurement apparatus 1 is associated with a weighing station 53 positioned downstream of the filling station 51, with reference to the direction of movement G of the capsules 100 in the filling machine 50, so as to measure the mass $m_a$ of the bottoms 100 containing doses of product P.

The plurality of operating stations 51-57 of the filling machine 50 further includes an exit station 56 in which the capsules 100 filled with the product and compliant are extracted from the movement device 30 and conveyed out of the filling machine 50 and a waste station 57 located downstream of the exit station 56 to remove the non-compliant capsules from the movement device 30.

An optional initial weighing station 55 provided with a respective mass measurement apparatus 1 of the invention and positionable between the feeding and opening station 52 and the filling station 51 for measuring the mass of the empty bottoms 101 is shown in FIG. 5 with dotted line. In this embodiment of the filling machine 50, the actual mass of the product dosed in the capsules 100 is calculated as the difference of the masses of the capsules 100 measured before and after the filling station 51.

FIG. 6 illustrates a variant of the filling machine 50 that differs from the embodiment above-described and referred to in FIG. 5, in that it does not comprise weighing stations since the mass measurement apparatus 1 is directly associated with the filling station 51 so as to measure the mass $m_a$ of only the doses of product P dosed in the bottoms 101. In this variant of the machine, the mass measurement apparatus 1 with the methods described above calculates the mass $m_a$ of the dose of product P by comparing the specific resonance frequency $f_0'$ of the gripping element 3 supporting the empty bottom 101 vibrated by the actuator means 13 with the operating resonance frequency $f_m'$ of the gripping element 3 supporting the bottom 101 with the dose of product P, vibrated by the actuator means 13. Alternatively, the mass measurement apparatus 1 is able to calculate the mass $m_a$ of the dose of product P by measuring a delay or operating phase difference $\Delta\phi_m$ between the vibration actuating signal generated by the actuator means 13 to make the gripping element 3 supporting the bottom 101 with the dose of product P vibrate at the specific resonance frequency $f_0'$ of the gripping element 3 supporting the empty bottom 101 and the vibration response signal of the gripping element 3 supporting the bottom 101 with the dose of product P detected by the sensor means 4.

Figure 7:
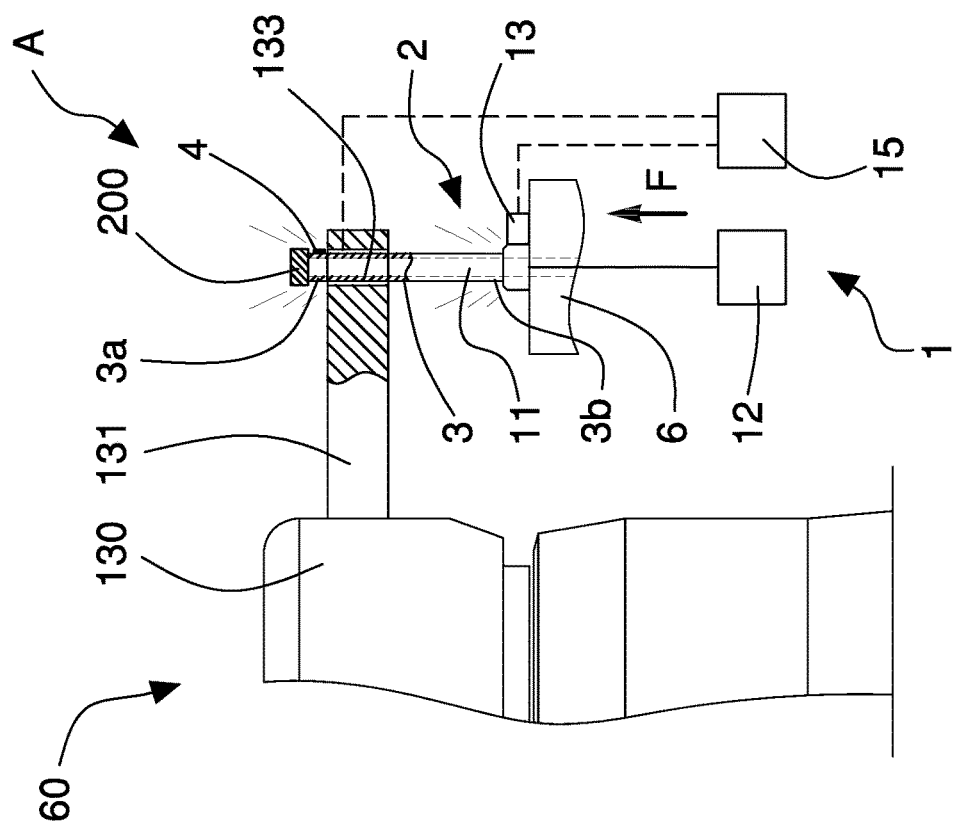
FIG. 7 is a schematic and partially sectional side view of the mass measurement apparatus of the invention associated with an automatic processing machine adapted to realize articles consisting of tablets, in a step of the mass measurement process of the tablets.

With reference to FIG. 7, the mass measurement apparatus 1 of the invention can also be associated with an automatic processing machine 60, in particular a compressing machine, arranged to realize articles 200 in the form of tablets or lozenges by compressing a product. The compressing machine 60, of known type and not illustrated and described in detail, comprises a movement device 130 adapted to transfer the tablets 200 to the mass measurement apparatus 1. The movement device 130 comprises, for example, a table rotatable about a vertical rotation axis and peripherally provided with a plurality of seats 133 adapted to house the tablets 200 produced in a previous product compression station.

The mass measurement apparatus 1 is identical to that previously described for the filling machine 50, the gripping elements 3 of the transferring and gripping means 2 in this case being arranged to remove from the seats 133 respective tablets 200 held on the shaped ends 3a of the aforementioned gripping elements 3 by the fastening means 11, 12.

The mass of the tablets 200 is calculated by the processing unit 15 by comparing the operating resonance frequency $f_m$ of the resonator/sample system (gripping element 3/tablet 200) and the specific resonance frequency $f_0$ of the resonator (gripping element 3) or, alternatively, by calculating the delay or operating phase difference $\Delta\phi_m$ between the resonator actuating signal (gripping element 3) and the response signal, detected by the sensor means 4 of the resonator/sample system (gripping element 3/tablet 200) both vibrated by the actuator means 13 to the specific resonance frequency $f_0$ of the resonator.

Referring to FIGS. 8 to 11, a variant of the mass measurement apparatus 1 of the invention is illustrated that differs from the embodiment described above and illustrated in FIGS. 1 to 4 for the transferring and gripping means 2 comprising at least one transferring element 5 movable along an extraction direction F and for removing an article 100; 200 or a part 101 thereof from a respective seat 33 of the movement device 30 and transferring it to a respective gripping element 7 of said transferring and gripping means 2, said gripping element 7 being provided with a housing 17 adapted to receive and hold the article 100 or a part 101 thereof.

Also in this variant, the mass measurement apparatus 1 is associated, by way of example and not of limitation, with a filling machine 50 arranged to fill with a product P articles 100 in the form of capsules 100, consisting of a lower part or bottom 101 and an upper part or cover 102.

The filling machine 50 is for example that illustrated in FIG. 5 and comprises the operating stations 51-57 arranged to perform operations on the capsules 100 moved in sequence with intermittent motion through the operating stations 51-57 by the movement device 30.

The transferring element 5 of the transferring and gripping means 2 in the filling machine 50 is then arranged to remove the lower part or bottom 101 (containing a dose of product P) of the capsule 100 from the respective seat 33 of the movement device 30 and transfer said bottom 101 to the corresponding gripping element 7. In particular, the transferring and gripping means 2 comprise a plurality of transferring elements 5 arranged side by side and in a number equal to that of the seats 33 of each support 35 so as to simultaneously extract all the bottoms 101 housed in the seats 33 and transfer them into a plurality of respective gripping elements 7.

The transferring and gripping means 2 also comprise at least one further transferring element 9 also movable along the extraction direction F and arranged to remove the bottom 101 from the respective gripping element 7 and insert it into the seat 33 of the movement device 30, after vibrating the gripping element 7 and measuring its operating resonance frequency $f_m$. In particular, the measurement apparatus 1 comprises a plurality of further transferring elements 9 arranged side by side and in a number equal to that of the transferring elements 5 and the gripping elements 3.

The transferring elements 5, 9 are movable along the extraction direction F, in particular almost vertical, between a first operative position D1, in which said transferring elements 5, 9 are disengaged and spaced from the bottom 101, housed in the respective seat 33 of the movement device 30 so as not to interfere with the movement of the latter, a second operative position D2, in which the transferring element 5 has extracted the bottom 101 from the seat 33 and inserted it into the respective gripping element 7, a third operative position D3 or measuring position, in which the transferring elements 5, 9 are disengaged and spaced from the bottom 101 housed and held in the housing 17 of the gripping element 7 so as to allow the latter to vibrate freely, and a fourth operative position D4, in which the further transferring element 9 has completely extracted the bottom 101 from the housing 17 and inserted it into the respective seat 33 of the movement device 30.

Each transferring element 5 has an elongated shape and is arranged to insert, when moved along the extraction direction F, inside a respective seat 33 of the movement device 30 to abut a lower portion of the bottom 101 and push the latter out of the seat 33 and inside the housing 17.

Each further transferring element 9 also has an elongated shape and has a shaped end 9a adapted to abut an upper portion of the bottom 101 so as to push the latter out of the housing 17 and inside the seat 33.

The mass measurement apparatus 1 comprises a supporting element 6 that supports the transferring elements 5, 9 and is movable along the extraction direction F, in particular to arrange the transferring elements 2, 9 in the different operative positions D1-D4.

The mass measurement apparatus 1 further comprises a further supporting element 8 adapted to rigidly support the gripping element 7 above the movement device 30 and aligned to the respective seat 33. The further supporting element 8 supports, in particular, the plurality of gripping elements 7 and is arranged above the movement device 30.

The housing 17 of each gripping element 7 has a lower opening that allows the insertion or disconnection of the bottom 101 into/from the housing 17 and for this purpose has a bevelled or rounded edge to facilitate the insertion of the bottom 101.

The housing 17 extends longitudinally, in particular parallel to the extraction direction F, and has an extension such as to contain the bottom 101 or the whole capsule 100. In the illustrated embodiment, the housing 17 is further converged or tapered starting from the lower opening towards the additional supporting element 8 above, its inner transverse section (almost orthogonal to the extraction direction F) progressively decreasing from the lower opening to a smaller dimension than an outer transverse dimension of the bottom 100a or the capsule 100, so that, upon complete insertion, the bottom 101 is held by force or interference coupling (by virtue of the elasticity of the material of which the bottom 101 is made and its hollow shape).

Alternatively, mechanical or pneumatic fastening means may be associated with the gripping element 7 to constrain the bottom 101 within the housing 17.

Each gripping element 7 also has one or more side, through and parallel openings to the extraction direction F, which allow the insertion and sliding of the terminal end 9a of the transferring element 9 inside the housing 17 and along the extraction direction F.

The actuator means include a vibrating actuator 13 or oscillator, for example a piezoelectric actuator, acting on the respective gripping element 7 with an actuating signal for oscillating or vibrating the latter, in particular at the respective resonance frequency, in particular the vibration actuating signal comprising a periodic force, for example sinusoidal, of adequate frequency and amplitude. The vibrating actuator 13 is connected, for example wirelessly, and controlled by the processing unit 15 and is fixed, for example, to an upper portion 7a of the gripping element 7 at the further supporting element 8.

It is also provided that instead of comprising a vibrating actuator 13 for each gripping element 7, the actuator means comprise a single vibrating actuator fixed to the further supporting element 8 and configured to vibrate all the gripping elements 7.

In a variant of the mass measurement apparatus 10 of the invention not illustrated, the actuator means comprise the same further supporting element 8, which is oscillated by external vibrations generated by the automatic processing machine 50 in the operation thereof and which oscillates the gripping elements 7 (rigidly supporting them) with oscillations having the resonance frequency.

The sensor means 4 comprise a plurality of vibration sensors, e.g. MEMS-type accelerometers, fixed directly to the respective gripping elements 7, in particular at their one of the lower portions 7b thereof.

Alternatively, the sensor means 4 may comprise a plurality of optical sensors, for example laser measurement sensors, each of which is pointed at the respective gripping element 7, in particular at one lower portion 7b thereof. The sensor means 4 are wirelessly connected to the processing unit 15.

Still alternatively, the sensor means 4 may comprise one or more piezoelectric and/or piezoresistive vibration sensors, e.g. strain-gauge sensors or PVDF elements, each of which are suitably fixed to the respective gripping element 7, in particular at a lower portion 7b thereof.

The operation of this variant of the mass measurement apparatus 1 of the invention is identical to that described above. However, the gripping element 7 can be suitably made with shapes and dimensions, in addition to the material (for example made of titanium alloy) which allow to significantly increase the resolution of the measurement apparatus 1. More specifically, it has been verified by the applicant that with a adapted configuration of said gripping element 7 in the measurement process of the measurement apparatus 1 of the invention at a mass variation of about 0.015-0.2 mg of the resonator/sample system (gripping element 3/bottom 101) corresponds to a variation of about 1 Hz of the resonance frequency. Since the sensor means 4 and the processing unit 15 are capable of detecting and measuring variations in hundredths of Hz, this variant of the measurement apparatus 1 of the invention is capable of measuring the mass of the bottoms 101 at a high resolution ranging from, for example, 0.00015 to 0.002 mg.

The measurement interval or time in which the sensor means 4 are able to measure the operating resonance frequency $f_m$ of the gripping element 7 supporting the bottom 101 and send the relative signal to the processing unit 15 is between 10 and 20 ms.

It is also possible to accurately calculate the mass $m_a$ of the bottoms 101 based on an operating phase difference $\Delta\phi_m$ between the actuating signal generated by the vibrating actuator 13 and the response signal detected by the sensor means 4, suitably connected to the corresponding gripping elements 7, and processed by the processing unit 15.

With reference to FIGS. 7 to 10, the operation of the mass measurement apparatus 1 of the invention associated with the automatic processing machine 50 arranged to fill capsules 100 with doses of product P, provides for the following operational steps.

During the operation of the machine, at each step of stopping the intermittent motion of the movement device 30, a seat 33 of the latter containing a bottom 101 with a relative dose of product P to be measured is arranged at a respective transferring element 5 of the transferring and gripping means 2 of the measurement apparatus 1. The transferring element 5, together with the corresponding further transferring element 9, is then moved along the extraction direction F from the first operative position D1 (FIG. 8) to the second operative position D2 (FIG. 9) so as to extract the bottom 101 from the respective seat 33 and insert it into the housing 17 of the gripping element 7 where it is held for example by interference coupling. The transferring elements 5, 9 are then moved to the third operative position D3 (FIG. 10) in which they are disengaged and spaced from the bottom 101 housed and held in the housing 17 of the gripping element 7. The latter is then vibrated by the actuator means 13 so as to resonate for the defined measurement interval or time, between 10 and 20 ms during which the sensor means 4 are able to measure the operating resonance frequency $f_m$ of the gripping element 7 housing the bottom 101 with the dose of product P and send the relative signal to the processing unit 15. The latter is thus able to calculate the mass $m_a$ of the bottom 101 by comparing the operating resonance frequency $f_m$ with the known specific resonance frequency $f_0$ of the gripping element 7 not supporting the bottom 101.

Alternatively, the gripping element 7, which holds the bottom 101 with the dose of product P, is forced to vibrate by the actuator means 13 at the specific resonance frequency $f_0$ of the gripping element 7 alone, for the defined measurement interval or time, between 10 and 20 ms. In this time interval, the sensor means 4 measure the vibration response signal of the gripping element 7 with the bottom 101 and the dose of product P and the processing unit 15 calculates the mass $m_a$ of the bottom 101 by measuring the operating phase difference $\Delta\phi_m$ between the vibration actuating signal generated by the actuator means 13 and the vibration response signal measured by the sensor means.

At the end of the measurement, i.e. at the end of the measurement time, the further transferring element 9, together with the transferring element 5, is moved to the fourth operative position D4 (FIG. 10) so as to remove the bottom 101 from the housing 17 of the gripping element 7 and insert it into the respective seat 33 of the movement device 30. After the stopping step, the movement device 30 is moved so as to position a subsequent seat 33 with the respective bottom 101 at the mass measurement apparatus 1.

Referring to FIG. 12, the variant of the mass measurement apparatus 1 of the invention described above can also be associated with a compressing machine 60, arranged to realize articles 200 in the form of tablets or lozenges by compressing a product.

The mass measurement apparatus 1 is identical to that previously described for the filling machine 50, the transferring elements 5 in this case being arranged to remove the respective tablets 200 from the seats 133 and insert them into the housings 17 of the respective gripping elements 7 and the further transferring elements 9 being arranged to remove the tablets 200 from the housings 17 and insert them into the respective seats 33 of the movement device 30.

The mass of the tablets 200 is calculated by the processing unit 15 by comparing the operating resonance frequency $f_m$ and the specific resonance frequency $f_0$ of the gripping elements 7 with or without the tablets 200 and oscillated or vibrated by the actuator means 13. Alternatively, the mass of the tablets 200 may be calculated based on the delay or operating phase difference $\Delta\phi_m$ between the actuating signal of the gripping element 7 and the response signal, detected by the sensor means 4 of the gripping element 7/tablet 200 system both vibrated by the actuator means 13 at the specific resonance frequency $f_0$ of the gripping element 7.

The method of the invention for measuring the mass $m_a$ of articles 100; 200 or parts 101 thereof processed in an automatic processing machine 50, 60, which includes at least one movement device 30; 130 provided with seats 33, 34; 133 for housing and moving the aforementioned articles 100; 200, comprising the following steps of:

removing an article 100; 200 or a part 101 thereof from a respective seat 33; 133 of the movement device 30; 130, holding the article 100; 200 or a part 101 thereof in a measuring position A; D3 and then reinserting the article 100; 200 or a part 101 thereof into the respective seat 33; 133 by means of transferring and gripping means 2 comprising at least one gripping element 3; 7 adapted to hold the article 100; 200 or a part 101 thereof in the measuring position A; D3;

applying, via an actuating signal, in particular a vibration or mechanical oscillation, a mechanical action to actuator means 13; 6 on the gripping element 3; 7 supporting the article 100; 200 or a part 101 thereof in the measuring position A; D3 to make the gripping element 3; 7 vibrate;

measuring by sensors means 4 a response signal of the gripping element 3; 7 supporting the article 100; 200 or a part 101 thereof and vibrated;

alternatively:

generating an actuating signal of the actuator means 13; 6 for applying a mechanical action adapted to vibrate the gripping element 3; 7 supporting the article 100; 200 or a part 101 thereof at an operating resonance frequency $f_m$, and then calculating a mass $m_a$ of the article 100; 200 or a part 101 thereof by comparing the operating resonance frequency $f_m$ with a specific resonance frequency $f_0$ of the gripping element 3; 7 when vibrated alone by the actuator means 13; 6; or generating an actuating signal of the actuator means 13; 6 capable of applying a mechanical action adapted to vibrate the gripping element 3; 7 supporting the article 100; 200 or a part 101 thereof at a specific resonance frequency $f_0$ of the gripping element 3; 7 when vibrated alone and then calculating a mass $m_a$ of the article 100;

200 or a part 101 thereof by measuring an operating phase difference $\Delta\phi_m$ between the actuating signal of the actuator means 13; 6 and the response signal detected by the sensor means (4).

The method further provides that the specific resonance frequency $f_0$ of the gripping element 3; 7 is preliminarily determined by the processing unit 15 by measuring by means of the sensor means 4 the response signal of the gripping element 3; 7 vibrated alone by the actuator means 13 before holding the article 100; 200 or a part 101 thereof, in particular before moving the transferring and gripping means 2 to remove the article 100; 200 or a part 101 thereof from a respective seat 33; 133 of the movement device 30; 130.

The invention claimed is:

1. A mass measuring apparatus associable with an automatic processing machine for measuring mass of articles or parts thereof, processed by the automatic processing machine that comprises at least one movement device provided with seats for housing and moving the articles, the mass measuring apparatus comprising:
    a transferring and gripping device arranged to remove an article or part thereof from a respective seat of the movement device, hold the article or part thereof in a measuring position and then reinsert the article or part thereof into the respective seat, said transferring and gripping device comprising at least one gripping element adapted to hold the article or part thereof in the measuring position;
    an actuator assembly arranged to operate with an actuating signal on said gripping element for making said gripping element vibrate alone at a specific resonance frequency;
    a sensor system configured for measuring a vibration response signal of said gripping element vibrating and supporting the article or part thereof in the measuring position; and
    a processing unit connected to said sensor system and arranged to receive the vibration response signal and to control said actuator assembly in order to:
        generate an actuating signal of said actuator assembly able to make said gripping element supporting the article or part thereof vibrate at an operating resonance frequency and then calculate a mass of the article or part thereof by comparing the operating resonance frequency with the specific resonance frequency of said gripping element; or alternatively
        generate an actuating signal of said actuator assembly able to make said gripping element supporting the article or part thereof vibrate at the specific resonance frequency of said gripping element and calculate a mass of the article or part thereof by measuring an operating phase difference between the actuating signal of said actuator assembly and the vibration response signal detected by said sensor system.

2. The mass measuring apparatus according to claim 1, wherein said gripping element is movable along an extraction direction and arranged to remove the article or part thereof from the respective seat of the movement device, hold the article or part thereof in the measuring position and then reinsert the article or part thereof in the respective seat.

3. The mass measuring apparatus according to claim 2, wherein said gripping element has an elongated shape and is arranged to be inserted when moved along the extraction direction inside and through the respective seat of the movement device, said gripping element comprising an operative end adapted to abut and support the article or part thereof.

4. The mass measuring apparatus according to claim 3, further comprising a fastening assembly associated with said gripping element and arranged to fix the article or part thereof to said operative end of said gripping element.

5. The mass measurement apparatus according to claim 4, wherein said fastening assembly comprises a suction duct inside said gripping element, leading to said operating end, and connected to an air suction unit.

6. The mass measurement apparatus according to claim 2, further comprising a supporting element rigidly supporting said gripping element and configured to be movable along the extraction direction to move said gripping element between an inactive position, where said gripping element is spaced from the respective seat, and the measuring position, in which said gripping element passes through the respective seat and supports and holds the article or part thereof.

7. The mass measurement apparatus according to claim 1, wherein said actuator assembly comprises at least one vibrating actuator, arranged to operate with the actuating signal on said gripping element to make said gripping element vibrate, said vibrating actuator being connected to, and controlled by, said processing unit.

8. The mass measurement apparatus according to claim 6, wherein said actuator assembly comprises said supporting element which is oscillated by external vibrations generated by the automatic processing machine in its operation.

9. The mass measurement apparatus according to claim 1, wherein said sensor system comprises at least one vibration sensor, said at least one vibration sensor being fixed to said gripping element or comprising at least one optical sensor pointed at said gripping element.

10. The mass measuring apparatus according to claim 1, wherein said transferring and gripping device further comprises at least one transferring element arranged to be movable along an extraction direction and to remove the article or part thereof from the respective seat of the movement device and transfer the article or part thereof to said gripping element of said transferring and gripping device, said gripping element being provided with a housing adapted to receive and hold the article or part thereof.

11. The mass measuring apparatus according to claim 10, wherein said transferring and gripping device further comprises at least one further transferring element associated with said transferring element and arranged to remove the article or part thereof from said gripping element and insert the article or part thereof into the respective seat of the movement device, once the vibration response signal is measured by said sensor system.

12. The mass measuring apparatus according to claim 11, wherein said transferring and further transferring elements are operable so as to be movable along the extraction direction between a first operative position, in which said transferring and further transferring elements are disengaged and spaced from the article or part thereof that is housed in the respective seat, a second operative position, in which said transferring element has extracted the article or part thereof from the respective seat and inserted the article or part thereof into said housing of said gripping element, a third operative position, in which said transferring and further transferring elements are disengaged and spaced from the at least one article or a part thereof that is housed and held in said housing so as to allow said gripping element to vibrate, and a fourth operative position, in which said further transferring element has extracted the article or part thereof from said housing and has inserted the article or part thereof inside the respective seat.

13. The mass measuring apparatus according to claim 10, wherein said transferring element has an elongated shape and is formed to be inserted, when moved along the extraction direction, inside the respective seat of the movement device in order to abut a lower portion of the article or part thereof and push the article or part thereof out of the respective seat and inside said housing.

14. The mass measuring apparatus according to claim 11, wherein said further transferring element has an elongated shape and has at least one shaped end adapted to abut an upper portion of the article or part thereof in order to push the article or part thereof out of said housing and into the respective seat.

15. The mass measuring apparatus according to claim 10, wherein said housing of said gripping element comprises a lower opening which allows insertion or extraction of the article or part thereof along the extraction direction, said housing being configured and/or sized so as to hold and lock by force or interference coupling the article or part thereof.

16. The mass measuring apparatus according to claim 10, further comprising at least one supporting element rigidly supporting said transferring element and movable along the extraction direction.

17. The mass measuring apparatus according to claim 10, further comprising at least one further supporting element arranged to support at least said gripping element above the movement device.

18. The mass measuring apparatus according to claim 17, wherein said actuator assembly comprises said further supporting element oscillated by external vibrations generated by the automatic processing machine in its operation.

19. The mass measuring apparatus-(1) according to claim 1, wherein the article is a capsule to be filled with a product, and wherein said gripping element holds a part of the capsule.

20. The mass measuring apparatus according to claim 1, wherein the article is a tablet or a pill obtained by compressing a product, and wherein said gripping element holds the tablet or pill.

21. An automatic processing machine comprising:
a plurality of operating stations for performing operations to make articles;
a movement device provided with seats for housing and moving the articles; and
at least one mass measuring apparatus according to claim 1 for measuring a mass of the articles or parts thereof.

22. The automatic processing machine according to claim 21, wherein
at least one of said operating stations is a filling station arranged to dispense doses of product inside the articles, and said mass measuring apparatus is associated with said filling station.

23. A method for measuring mass of articles or parts thereof that are processed in an automatic processing machine, which includes at least one movement device provided with seats for housing and moving the articles, the method comprising the steps of:
removing an article or a part thereof from a respective seat of the movement device, holding the article or part thereof in a measuring position and then reinserting the article or part thereof into the respective seat by a transferring and gripping device comprising at least one gripping element adapted to hold the article or part thereof in the measuring position;
applying, via an actuating signal of an actuator assembly, a mechanical action on the gripping element supporting the article or part thereof in the measuring position to make the gripping element vibrate;
measuring by a sensor system a vibration response signal of the gripping element supporting and vibrating the article or part thereof; and
performing alternatively:
generating an actuating signal of the actuator assembly in order to apply a mechanical action adapted to vibrate the gripping element supporting the article or part thereof at an operating resonance frequency and then calculating a mass of the article or part thereof by comparing the operating resonance frequency with a specific resonance frequency of the gripping element when vibrated alone by the actuator assembly; or
generating an actuating signal of the actuator assembly in order to apply a mechanical action adapted to vibrate the gripping element supporting the article or part thereof at the a specific resonance frequency of the gripping element when vibrated alone and then calculating a mass of the article or part thereof by measuring an operating phase difference between the actuating signal of the actuator assembly and the vibration response signal detected by the sensor system.

24. The method according to claim 23, wherein the specific resonance frequency of the gripping element is processed by measuring by the sensor system the vibration response signal of the gripping element vibrated alone by the actuator assembly before holding the article or part thereof.

25. The mass measurement apparatus according to claim 1, wherein said sensor system comprises at least one among a MEMS accelerometer, a deformation sensor, a bending sensor, a torsion sensor, or a sensor comprising a piezoelectric element or a piezoresistive element.

* * * * *